United States Patent [19]

Mizushima et al.

[11] 4,372,607
[45] Feb. 8, 1983

[54] FORWARDLY INCLINING SEAT

[75] Inventors: Yoichi Mizushima, Yokohama; Taketoshi Hosonaga, Tokyo, both of Japan

[73] Assignee: Nissan Motor Co., Ltd., Yokohama, Japan

[21] Appl. No.: 193,258

[22] Filed: Oct. 2, 1980

[30] Foreign Application Priority Data

Oct. 3, 1979 [JP] Japan .................... 54-127794

[51] Int. Cl.³ ............................................. B60N 1/02
[52] U.S. Cl. ................................. 297/325; 296/65 R; 297/331
[58] Field of Search ............................. 297/325–329, 297/331, 335, 341; 296/65 R

[56] References Cited

U.S. PATENT DOCUMENTS

| 1,578,676 | 3/1926 | Morgan | 297/325 X |
| 1,592,593 | 7/1926 | Anderson | 297/325 X |
| 1,957,004 | 5/1934 | Smith | 297/325 |
| 2,132,305 | 10/1938 | Lescalleet | 297/326 X |
| 2,565,666 | 8/1951 | Schaefer | 297/326 X |
| 2,618,312 | 11/1952 | Bradley | 297/341 |
| 3,880,464 | 4/1975 | Murphy | 297/326 |
| 4,052,102 | 10/1977 | Rosenthal | 297/341 |

FOREIGN PATENT DOCUMENTS 417631 9/1910 France ......................... 297/331

Primary Examiner—Francis K. Zugel

[57] ABSTRACT

Forwardly inclining seat having a common rotating axis for the front support legs of a seat cushion frame. The whole seat can be inclined forwardly about the obliquely extending common rotating axis to provide a comparatively wide space for passing to the rear seat.

2 Claims, 6 Drawing Figures

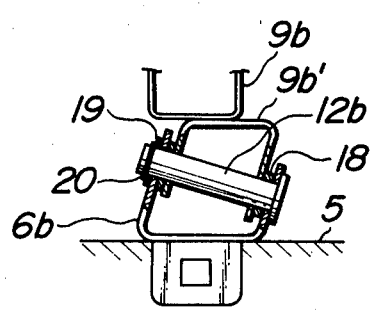
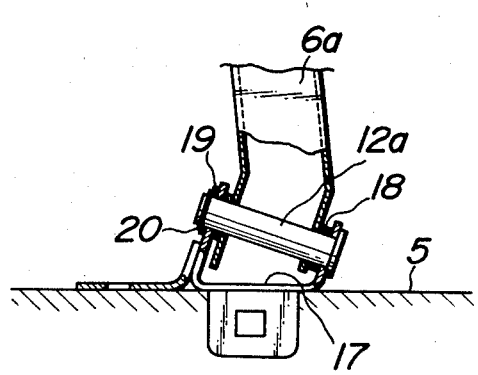
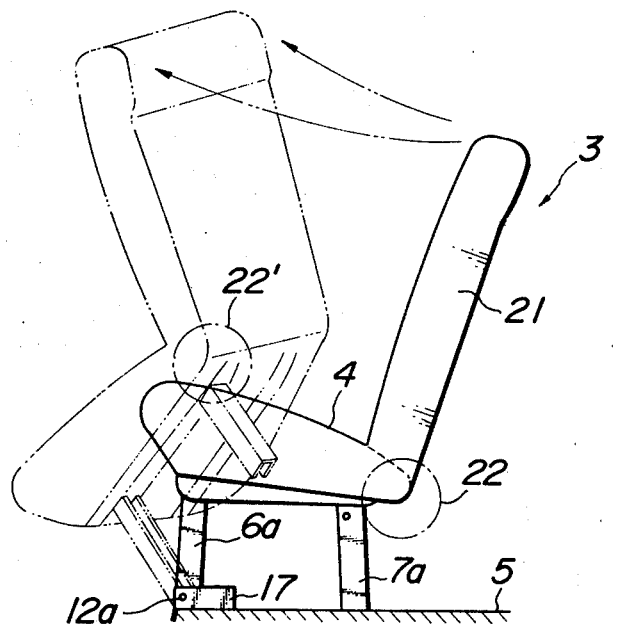

FORWARDLY INCLINING SEAT

BACKGROUND OF THE INVENTION

The present invention relates to a vehicle seat, more particularly to a seat suitable for a two-door type vehicle.

In a two-door type automobile, means for moving the front seat must be provided because in the usual position the front seat obstructs passage to the rear seat. For instance, a reclining device is provided in the front seat and the seat back is bent forwardly by the same reclining device. Also, the whole of the front seat is slid forwardly by means of slide rails, or only the seat back portion is rotated towards center of the body on the same plane, or the whole of the front seat is turned towards the center of the body by a bent rail on the same plane. Such various type of seats have been proposed and used in practice.

However, the conventional seats have still some inconveniences even though some of them have a certain merit in some aspect.

As for example, in a front seat of the reclining type or of a type where only the seat back is rotated, although there is a merit to widely utilize the upper space of the cabin at the time of taking a seat in the car or getting off from the seat, there is an inconvenience in that the lower space can not be utilized widely since there is the rear portion of the seat cushion which occupies a considerable space. Further, in a type of the front seat using slide rails, although a considerably wide upper space and lower space for entering or getting out is available, existence of the slide rails or bracket on the floor interferes with stepping in or out by customer and it necessarily involves problems of cost due to the complicated sliding mechanism.

SUMMARY OF THE INVENTION

The present invention is to improve the aforementioned inconveniences of the conventional devices of this kind and is to provide a forwardly inclining seat conveniently to be applied to two-door type vehicles. The present invention intends to realize a forwardly inclining means of a comparatively simple construction by which the whole of the seat may be inclined oblique forwardly so that the corner portion of the seat cushion which is the most troublesome to pass on foot when getting in or out can be moved obliquely forwardly to provide a sufficiently wide space for passing.

BRIEF DESCRIPTION OF THE DRAWING

FIGS. 3 and 4 are enlarged front views showing the mount of the inclined rotating axes taken at circle marks III and IV in FIG. 2, respectively;

FIG. 6 is an explanatory view showing a condition, in which the whole of the seat is inclined obliquely forwardly.

DESCRIPTION OF THE PREFERRED EMBODIMENT

The invention will now be explained in more detail by referring to the accompanying drawings.

Figure 1:
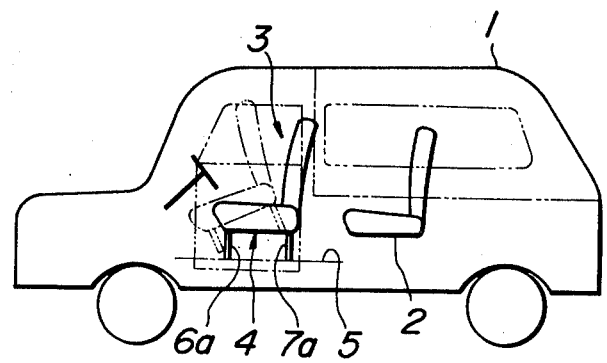
FIG. 1 is a schematic view of a two-door type vehicle.
Figure 5:
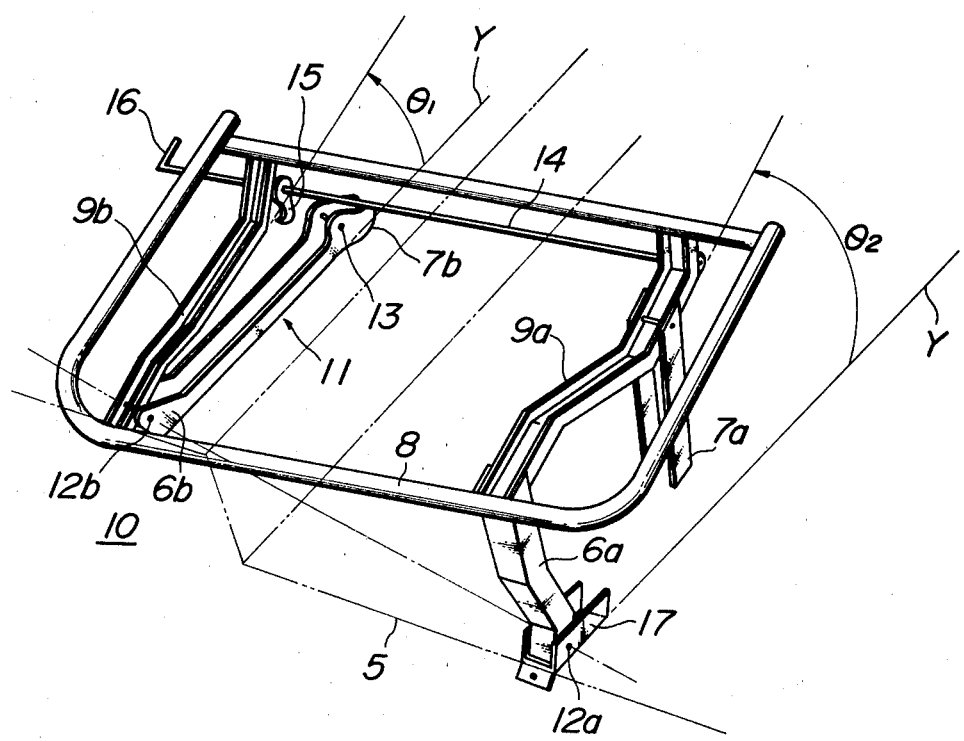
FIG. 5 is a perspective view of an essential portion of the forwardly inclining seat.

FIG. 1 shows a two-door vehicle 1 of a truck type having a somewhat higher floor level. As shown just schematically, this type of truck comprises a fixed rear seat 2 and a forwardly inclineable front seat 3. Seat cushion 4 of the front seat 3 is equipped with front support legs 6a and 6b and rear support legs 7a and 7b for supporting the seat cushion 4. More details of the same are shown in FIG. 5. A support frame 8 and leg support frames 9a and 9b are mounted onto a cushion frame (not shown) of the seat cushion 4 and the front support legs 6a and 6b and the rear support legs 7a and 7b are coupled with the leg support frames 9a and 9b. In the case of the illustrated embodiment, however, at the side of the leg support frame 9b, a bracket arm 11, which takes the task of the front support leg 6b and the rear support leg 7b, is directly fixed since the floor level is made somewhat higher due to the presence of equipment space accommodating the transmission (not shown) and other equipment. At the front portion of the bracket arm 11 corresponding to the location of the front support leg 6b, an obliquely extending rotating axis 12b is provided and the leg support frame 9b can freely be rotated about this rotating axis 12b with respect to the bracket arm 11. At the rear portion of the bracket arm 11 corresponding to the location of the rear support leg 7b, a locking pin 13 is provided and a locking hook 15 mounted on a rod 14 is provided at a corresponding lower position of the leg support frame 9b. This rod 14 has at one end, a lever 16 and by rotating this lever 16, the locking hook 15 and the locking pin 13 can be unlocked.

At the side of the leg support frame 9a, the floor level is low and the front support leg 6a and the rear support leg 7a are provided at front and rear positions of the leg respectively as the supporting members so as to support the seat cushion 4 at a parallel level with respect to the level of the floor 5. The top portion of the front support leg 6a is welded to the leg support frame 9a and the bottom portion of a same is pivotted about the rotating axis 12a on a bracket 17 fixed on the floor 5. The top portion of the rear support leg 7a is fixed with the leg support frame 9a and the bottom portion thereof is not fixed on the surface of the floor 5 but simply abuts thereon so as to be freely removable.

Figure 2:
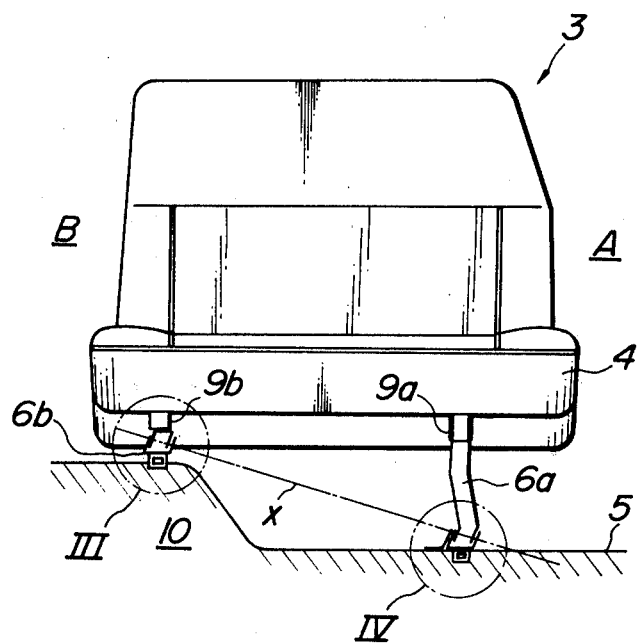
FIG. 2 is a front view of a front seat, made in accordance with one embodiment of the present invention.

The front support legs 6a and 6b and the rear support legs 7a and 7b provided respectively at either side of the seat cushion 4 for supporting the same (in the illustrated embodiment, in FIG. 2, at the door side A and at the body center side B) are not limited to the illustrated embodiment only, but they may be of various types and sizes match the kind of vehicle, to the floor construction, the shape of the seat and to meet other conditions.

The inclined rotating axes 12a and 12b provided respectively on the front support legs 6a and 6b, are in alignment with the same oblique line X forming an inclined angle with the surface of the floor 5. These rotating axes 12a and 12b form supporting points of the seat cushion 4 or of the whole seat 3. The present invention has its remarkable feature in that the rotating axes 12a and 12b are aligned on a common inclined line X forming a certain angle with respect to the surface of the floor 5. On these inclined rotating axes 12a and 12b, respective collars 18, washers 19 and E-shaped rings 20 are mounted to from stable and safe rotating supporting points. (Refer to FIG. 3 and FIG. 4) In FIG. 3, 9b' is an auxiliary bracket welded to the leg support frame 9b and the rotating axis 12b is passed through this auxiliary bracket 9b'.

As a result of the arrangement of the inclined rotating axes 12a and 12b on the common oblique line X in a manner as described in the foregoing, the front supporting member on the door side A (the front support leg 6a in the illustrated embodiment) is provided with the rotating axis 12a near the floor and the front supporting member on the body center side (the front portion 6b of the bracket arm 11 in the illustrated embodiment) is provided with the rotating axis 12b near the seat cushion. The illustrated embodiment is concerned with a vehicle having separate seats for driver and passenger. In a bench type front seat, the inclined line X may be arranged to extend from the passenger side towards an upper point of the driver side or it may be arranged in reverse.

The operation of the device will be explained hereinafter. At first, by rotating the lever 16, the locking hook 15 is disengaged from the locking pin 13 to be in unlocked condition and the seat 3 may be inclined forwardly by pushing by hand at a suitable portion of the seat 3 about the inclined rotating axes 12a and 12b provided on the front support legs 6a and 6b as the supporting points of rotation. By this motion the seat cushion 4 of the seat 3 as a whole is inclined forwardly. Since both supporting points of the rotation are the inclined rotating axes 12a and 12b, which are aligned on a common oblique line X forming a certain angle with the surface of the floor 5, the forwardly inclined seat 3 as a whole occupies a forwardly and upwardly inclined position and the seat cushion 4 and the corner portion 22 of the seat back 21 as now moved into lifted up positions as can better be seen from the dash-dot line in FIG. 6. The leg support frame 9b at the body center side B rotates by a smaller angle $\theta_1$ against a reference line Y extending along the upper surface of the floor 5 as shown in FIG. 5, and the leg support frame 9a at the door side rotates by a larger angle $\theta_2$. The corner portion 22 occupies an oblique forward position, it is lifted up or moved towards center. The rear support leg 7a of the door side is also moved up simultaneously and brought into oblique forward position. At a certain inclined angle of the seat 3, the seat back 21 may interfere with the windshield glass or the like and be stopped at this position and a further forward movement is prevented. For returning the seat 3 to the original position, the operation may be effected reversed as mentioned above and the locking hook 15 may be engaged with the locking pin 13 to prevent undesired forward inclination of the seat.

As has been explained in the foregoing according to the present invention, among the front and rear support legs for supporting the seat cushion on the floor, the front support legs are provided with rotating axes extending on the same inclined line inclined with respect to the surface of the floor, and the rear support legs are made to freely contact the floor or disengage therefrom. Thus, by pushing the seat forwardly it can be moved to a position of not only a mere forward inclination but it inclines obliquely toward the center about the rotating supports extending on the same inclined line, and the door side corner of the seat and the rear support leg are moved upwardly and obliquely forwardly. Space for access to the rear seat is quite widely expanded. In this space, there are no obstacles such as the rear support leg or usually provided slide rails, brackets or the like so that getting into or off the rear seat becomes very easy. Moreover, this forwardly inclining seat is provided only with the inclined rotating axes for forward inclination at the front support legs extending on a common inclined line so that the conventional moving means for the seat, such as the slide rails or the like are not needed and thus the manufacturing cost can be decreased, and it affords a substantial effect in practice.

In the foregoing explanation, the front seat is explained as being of the type not provided with a reclining device, but such a reclining device may freely be incorporated when desired. Further, the application of the forwardly inclining seat of the present invention is not limited to the front seat only, but it may well be applied to the rear seat. It is also possible to provide a slide rail between the cushion frame and the supporting member so as to arrange to incline the slide rail forwardly together with the forward movement of the seat cushion. By this joint construction of the seat frame and the slide rail, both functions, of forward inclination and sliding, can be applied to the seat.

The provision of the front support legs, one at either side, as in the illustrated embodiment is a mere example, but naturally the support legs may be in number one, two three or more.

What is claimed is:

1. In combination: a vehicle having a vehicle floor with a first portion at one side of the vehicle at a first level, and a second portion spaced laterally from said first portion towards the center of the vehicle and at a second level higher than said first level, a seat having a support frame for supporting a seat cushion normally horizontally in said vehicle, first and second leg support frames fixed to said support frame at laterally spaced apart positions above said first and second portions respectively, first and second front and rear support legs respectively fixed to said first and second leg support frames, and means for respectively rotatably supporting said front support legs about a common axis inclined obliquely with respect to said first level, said rear support legs being movable away from said floor, whereby said seat is adapted to be rotated about said axis and said seat inclined forwardly and lifted upwardly towards said center about said axis.

2. The combination according to claim 1, wherein said second front and rear support legs are integrally connected to said second leg support frame.

* * * * *